(12) United States Patent
Simm et al.

(10) Patent No.: US 10,471,562 B2
(45) Date of Patent: Nov. 12, 2019

(54) GUIDING SYSTEM

(71) Applicant: Robert Bosch GmbH, Stuttgart (DE)

(72) Inventors: Robert Simm, Oekingen (CH);
Thomas Bannwart, Wiedlisbach (CH)

(73) Assignee: Robert Bosch GmbH, Stuttgart (DE)

(*) Notice: Subject to any disclaimer, the term of this patent is extended or adjusted under 35 U.S.C. 154(b) by 520 days.

(21) Appl. No.: 14/045,852

(22) Filed: Oct. 4, 2013

(65) Prior Publication Data
US 2014/0097565 A1   Apr. 10, 2014

(30) Foreign Application Priority Data
Oct. 4, 2012   (DE) .................. 10 2012 218 110

(51) Int. Cl.
  *B23Q 1/00*   (2006.01)
  *B23Q 9/00*   (2006.01)

(52) U.S. Cl.
  CPC ......... *B23Q 9/0014* (2013.01); *B23Q 9/0042* (2013.01); *B23Q 9/0078* (2013.01)

(58) Field of Classification Search
  CPC ............................ B23Q 9/0028; B23Q 9/0042
  USPC ........................................ 269/1; 83/637, 829
  See application file for complete search history.

(56) References Cited

U.S. PATENT DOCUMENTS

| | | | |
|---|---|---|---|
| 3,373,781 A * | 3/1968 | Grosswald | B23Q 9/0042 83/448 |
| 3,586,077 A * | 6/1971 | Pease | B23Q 9/005 30/376 |
| 4,078,309 A | 3/1978 | Wilson | |
| 4,138,914 A | 2/1979 | Reeder | |
| 4,335,512 A * | 6/1982 | Sheps | B23Q 9/0014 30/376 |
| 4,624,054 A | 11/1986 | Edwards | |
| 4,751,865 A * | 6/1988 | Buckalew | B23Q 1/40 83/486.1 |
| 4,786,215 A * | 11/1988 | McClure | B23Q 9/0014 30/360 |
| 4,903,680 A * | 2/1990 | Chiuminatta | B23Q 9/0014 125/13.01 |
| 5,044,075 A * | 9/1991 | Brennan | B23D 47/02 29/33 T |
| 5,083,375 A | 1/1992 | Helm, Sr. | |
| 2003/0116331 A1 | 6/2003 | Boyl-Davis et al. | |

(Continued)

FOREIGN PATENT DOCUMENTS

CN    1993204 A    7/2007
DE    87 06 730 U1   10/1987

(Continued)

*Primary Examiner* — Lee D Wilson
(74) *Attorney, Agent, or Firm* — Maginot, Moore & Beck LLP

(57) ABSTRACT

A guiding system for portable machine tools has at least one guiding apparatus which is fixable on a portable machine tool. The guiding system also has at least one positive guidance unit to which the at least one guiding apparatus is connectable in a positive-locking manner to positively guide the portable machine tool. The guiding system also has at least one position fixing unit configured to fix a position of the at least one guiding apparatus on the at least one positive guidance unit. The at least one position fixing unit has at least one fastening unit configured to releasably fix the at least one position fixing unit on the at least one guiding apparatus.

18 Claims, 7 Drawing Sheets

(56) References Cited

U.S. PATENT DOCUMENTS

| | | | |
|---|---|---|---|
| 2003/0233922 A1* | 12/2003 | Makropoulos | B23Q 9/0042 83/574 |
| 2005/0061128 A1* | 3/2005 | Caughlin | B23Q 9/0042 83/574 |
| 2007/0251370 A1 | 11/2007 | Hsieh | |
| 2009/0049972 A1* | 2/2009 | Thomas | B23Q 9/0014 83/697 |
| 2011/0041659 A1* | 2/2011 | Williams | B26D 1/10 83/13 |

FOREIGN PATENT DOCUMENTS

| | | |
|---|---|---|
| DE | 37 41 439 A1 | 6/1989 |
| DE | 39 01 556 A1 | 7/1990 |
| DE | 20 2005 011 655 U1 | 11/2005 |
| EP | 1 418 018 A1 | 5/2004 |
| EP | 1 707 328 A1 | 10/2006 |
| EP | 2 412 486 A2 | 2/2012 |
| WO | 02/26439 A1 | 4/2002 |
| WO | 03/049899 A2 | 6/2003 |
| WO | 2006/014192 A2 | 2/2006 |

\* cited by examiner

GUIDING SYSTEM

This application claims priority under 35 U.S.C. § 119 to patent application no. DE 10 2012 218 110.5, filed on Oct. 4, 2012 in Germany, the disclosure of which is incorporated herein by reference in its entirety.

BACKGROUND

Guiding systems for portable machine tools are already known, the guiding systems including a guiding apparatus which is fixable on a portable machine tool, a positive guidance unit to which the guiding apparatus is connectable in a positive-locking manner for positive guidance of the portable machine tool and a position fixing unit for fixing a position of the guiding apparatus on the positive guidance unit.

SUMMARY

The disclosure proceeds from a guiding system for portable machine tools, in particular a hand-held machine tool linear guiding system for portable machine tools, said guiding system having at least one guiding apparatus which is fixable on a portable machine tool, having at least one positive guidance unit to which the guiding apparatus is connectable in a positive-locking manner for positive guidance of the portable machine tool and having at least one position fixing unit for fixing a position of the guiding apparatus on the positive guidance unit.

It is proposed that the position fixing unit has at least one fastening unit for releasably fixing the position fixing unit on the guiding apparatus. In a preferred manner, by means of interaction with the positive guidance unit, the guiding apparatus is provided for the purpose of guiding the portable machine tool in a linear manner. The term "provided" is to be understood, in particular, as specially configured and/or specially equipped. The positive guidance unit is preferably realized as guide rails. "Positive guidance", in this case in particular, is to be understood as guidance of the portable machine tool by means of at least one positive force acting on the portable machine tool transversely with respect to a direction of movement when it moves in a plane along a predefined path. The term "positive force", in this case in particular, is to define a force which is provided for the purpose of preventing a body from moving in at least one direction and/or of supporting the body when it moves along a path which is predefined by means of the force acting on the body. The term "portable machine tool", in this case in particular, is to define a machine tool for processing workpieces which is able to be transported by an operator without using transporting machines. The portable machine tool has, in particular, a mass which is less than 40 kg, in a preferred manner less than 10 kg and in a particularly preferred manner less than 5 kg. In a particularly preferred manner, the portable machine tool is realized as a surface milling machine. However, it is also conceivable for the portable machine tool to have another development which appears sensible to an expert such as, for example, a development as a compass saw, as a drill, as a heavy-duty hammer drill and/or chisel hammer etc.

The guiding apparatus is preferably arranged in at least one operating state on a side of a support unit of the portable machine tool remote from a machine tool housing of the portable machine tool. A "support unit", in this case in particular, is to be understood as a unit which rests on a workpiece during processing of the workpiece by means of the portable machine tool where the portable machine tool is handled appropriately, and in particular with a support surface of the support unit which is provided for the purpose of supporting the portable machine tool on the workpiece during processing of the workpiece. In a particularly preferred manner the support unit is realized as a sliding block and/or as a base plate. With the portable machine tool uncoupled from the guide apparatus, during processing of a workpiece the portable machine tool preferably slides by way of the support surface, in particular by way of the support surface of the support unit, along a surface of the workpiece to be processed. In a particularly preferred manner, when coupled to the guiding apparatus the portable machine tool is arranged on a side of a basic body of the guiding apparatus facing the portable machine tool. Consequently, when coupled to the guiding apparatus, the support surface of the support unit lies on the basic body. When fastened on the support unit of the portable machine tool, the guiding apparatus is preferably arranged in a captive manner on the portable machine tool. Furthermore, when the guiding apparatus is connected to the positive guidance unit, a support surface of the support unit of the portable machine tool, with the portable machine tool connected to the basic body of the guiding apparatus, is advantageously aligned at least substantially parallel to a surface of a workpiece to be processed. In a particularly preferred manner, the guiding system together with a portable machine tool, in particular with a surface milling machine, forms a processing system for processing a workpiece to be processed.

The term "position fixing unit", in this case in particular, is to define a unit which fastens the guiding apparatus in a position in relation to the positive guidance unit on the positive guidance unit by means of a positive-locking and/or friction-locking connection. In a preferred manner, the guiding apparatus is releasably fastened in different positions on the positive guidance unit by means of the position fixing unit for putting in place a row of holes, already known to an expert, by means of a portable machine tool which is arranged on the guide apparatus. The term "releasably fastened", in this case in particular, is to refer to fastening of at least one unit and/or at least one element on a further unit and/or a further element, the unit and/or the element being separable, in particular separable in a tool-free manner, from the further unit and/or the further element. The position fixing unit is removable as one whole unit from the guiding apparatus once a connection between the fastening unit and the guiding apparatus has been released. Consequently, the position fixing unit can be removed advantageously and it is possible to refrain from an individual disassembly of individual elements of the positioning unit. By means of the development of the guiding system according to the disclosure, it is possible to replace or remove the position fixing unit in an advantageous manner. Consequently, it is possible for the position fixing unit to be removed, for example, where the guiding apparatus is not used. Furthermore, it is possible in an advantageous manner to retrofit already existing guide apparatuses with a position fixing unit according to the disclosure. In addition, in an advantageous manner it is possible to introduce a row of holes, in particular for furniture construction, in a consistent manner in a workpiece by means of interaction between the guide apparatus, the positive guidance unit and the position fixing unit.

In addition, it is proposed that the fastening unit includes at least one coupling element, by means of which the position fixing unit is fastenable in a positive-locking manner and/or in a friction-locking manner on the guiding apparatus. In this connection, the coupling element can be realized as a latching hook, as a groove and tongue element or as a further coupling element which seems sensible to an expert. In a preferred manner, the coupling element is provided for the purpose of engaging in a counter coupling element of the guiding apparatus, realized as a coupling recess, by means of engagement. The coupling element is preferably integrally molded on a basic body of the position fixing unit. "Integrally" is to be understood in particular as at least connected in a positively-bonded manner, for example by means of a welding process, a bonding process, an injection process and/or another process which seems sensible to the expert, and/or to be understood as molded advantageously in one piece, such as for example by being produced from a casting process and/or by being produced in a single or multiple component injection molding method and advantageously from one single blank. However, it is also conceivable for the coupling element to be realized separately from the basic body and to be fastened on the basic body by means of a fastening element, which seems sensible to an expert, such as, for example, a screw element, etc. A reliable, releasable fastening of the position fixing unit on the guiding apparatus can be achieved by means of the development according to the disclosure.

In an advantageous manner, the fastening unit includes at least one coupling element which interacts with a counter coupling element of the guiding apparatus for fastening the position fixing unit. The counter coupling element can be realized as a rib, as a latching recess which corresponds with a latching hook, as a latching hook, as a groove, etc. Consequently, a reliable positive-locking connection between the position fixing unit and the guiding apparatus can be made possible in an advantageous manner for fixing the position fixing unit.

In addition, it is proposed that the position fixing unit includes at least one movably mounted latching element for fixing a position of the guiding apparatus on the positive guidance unit. The term "movably mounted on", in this case in particular, is to define a bearing arrangement of the latching element on a basic body of the position fixing unit, the latching element, in particular uncoupled by elastic deforming of the latching element, having a possibility for movement along at least one section greater than 1 mm, in a preferred manner greater than 10 mm and in a particularly preferred manner greater than 20 mm and/or a possibility for movement about at least one axis by an angle greater than 10°, in a preferred manner greater than 45° and in a particularly preferred manner greater than 60°. In a preferred manner the latching element is realized as a latching bolt. In this connection, the latching element is preferably mounted on the basic body so as to be movable in a translatory manner. In addition, the latching element is mounted on the basic body so as to be additionally pivotable. A simple releasing of a fastening of the latching element for a movement of the guiding apparatus in relation to the positive guidance unit can be achieved in an advantageous manner by means of the development according to the disclosure.

Furthermore it is proposed that the position fixing unit includes at least one retaining element by means of which at least one latching element of the position fixing unit is held in opposition to a movement as a result of a spring force. A "retaining element", in this case in particular, is to be understood as an element which fixes the latching element in at least one position in relation to the basic body or avoids a movement as a result of a spring force acting on the latching element in at least one state. In this connection, the retaining element can be realized as a positive-locking element and/or as a friction-locking element which makes it possible to fix the latching element in a position in relation to the basic body. Maintaining a release position for permanent displaceability of the guiding apparatus, where the guiding apparatus is arranged on the guidance unit, can be made possible in an advantageous manner by means of the development according to the disclosure. Consequently, precise positioning of a groove by means of interaction between a portable machine tool, the guiding apparatus and the positive guidance unit can be achieved in an advantageous manner.

In addition, it is proposed that the position fixing unit includes at least one spring element which acts upon at least one latching element of the position fixing unit with a spring force in the direction of a latching position of the latching element. A "spring element" is to be understood, in particular, as a macroscopic element which has at least two ends spaced apart from one another which, in a normal operating state, are movable elastically along a movement section, the movement section being at least greater than 0.5 mm, in particular greater than 1 mm, preferably greater than 2 mm and in a particularly advantageous manner greater than 3 mm, and which macroscopic element generates in particular a counter force which depends on an elastic movement of the ends in relation to one another, is preferably proportional to the elastic movement of the ends in relation to one another and counteracts the movement. A "macroscopic element" is to be understood, in particular, as an element with an extension of at least 1 mm, in particular of at least 5 mm and preferably of at least 10 mm. In a preferred manner, the spring element is realized as a compression spring. However, it is also conceivable for the spring element to have another development which seems sensible to an expert, such as, for example, a development as a tension spring. In a particularly preferred manner, the spring element is realized as a helical compression spring. However, it is also conceivable for the spring element to have another development which seems sensible to an expert, such as, for example, a development as a torsion spring, a volute spring, a cup spring, etc. The spring element is preferably provided for the purpose of loading the latching element, when arranged on the guiding apparatus and when the guiding apparatus is arranged on the positive guidance unit, with a spring force in the direction of the positive guidance unit. An automatic latching function of the latching element can be made possible in an advantageous manner by means of the development according to the disclosure. Consequently, a high level of ease of operation can be achieved in an advantageous manner.

In addition, it is proposed that the guiding system includes at least one stop apparatus which is releasably fastenable on the positive guidance unit for positioning the positive guidance unit on a workpiece. A "stop apparatus", in this case in particular, is to be understood as an apparatus which defines or prevents a movement of the positive guidance unit, with the positive guidance unit arranged on a workpiece, at least in one direction. For defining or avoiding a movement of the positive guidance unit in relation to the workpiece, with the positive guidance unit arranged on a workpiece, the stop apparatus includes at least one support surface, by way of which the support apparatus abuts in a positive-locking manner against the workpiece. Positioning the positive guidance unit in relation to a workpiece to be processed can be undertaken in a convenient manner by means of the development according to the disclosure.

Furthermore, it is proposed that the stop apparatus includes at least one movably mounted locking element by means of which the stop apparatus is releasably fastenable in a position on the positive guidance unit. The locking element is preferably realized as a movably mounted clamping element. In a preferred manner, the stop apparatus includes at least one control element for moving the locking element. The locking element is preferably mounted so as to be movable in a translatory manner. However, it is also conceivable for the locking element to be mounted movably in a rotational manner for a releasable fastening of the stop apparatus. Secure fastening of the stop apparatus on the positive guidance unit can be made possible in an advantageous manner by means of the development according to the disclosure.

In addition, it is proposed that the stop apparatus includes at least one spring element which acts on at least one locking element of the stop apparatus with a spring force in the direction of a fixing position of the locking element. The spring element is preferably realized as a compression spring. Secure positioning of the stop apparatus on the positive guidance unit can be achieved in an advantageous manner as a result.

In addition, it is proposed that the stop apparatus includes at least one stop element which is movably mounted on a basic body of the stop apparatus. In a preferred manner, the stop element is mounted movably on the basic body so as to be translatory in relation to the basic body. However, it is also conceivable for the stop element to be mounted on the basic body so as to be pivotable and/or rotatable. It is possible to set different spacings between holes when introducing a row of holes in dependence on the thickness of a board of bottom and/or shelf boards by means of the development according to the disclosure. Consequently, the guiding system according to the disclosure can be utilized in an advantageous manner for a wide spectrum of use.

Furthermore, the disclosure proceeds from a position fixing unit of a guiding system according to the disclosure. In an advantageous manner, retrofitting an already existing guiding apparatus with a position fixing unit according to the disclosure can be made possible.

In addition, the disclosure proceeds from a stop apparatus of a guiding system according to the disclosure. In an advantageous manner, it is possible to retrofit an already existing positive guidance unit with a stop apparatus according to the disclosure in order to make possible convenient and precise processing of workpieces, in particular precise positioning of rows of holes in a workpiece.

In this connection, the guiding system according to the disclosure, the position fixing unit according to the disclosure and/or the stop apparatus according to the disclosure are/is not to be restricted to the above-described application and embodiment. In particular, for fulfilling a method of operation described herein, the guiding system according to the disclosure, the position fixing unit according to the disclosure and/or the stop apparatus according to the disclosure can have a number of individual elements, components and units which differs from the number named herein.

BRIEF DESCRIPTION OF THE DRAWINGS

Further advantages proceed from the following description of the drawing. Exemplary embodiments of the disclosure are shown in the drawing. The drawing and the description include numerous features in combination. In an expedient manner, the expert will also consider the features individually and will group them together to form sensible further combinations.

In which drawing.

DETAILED DESCRIPTION

Figure 1:
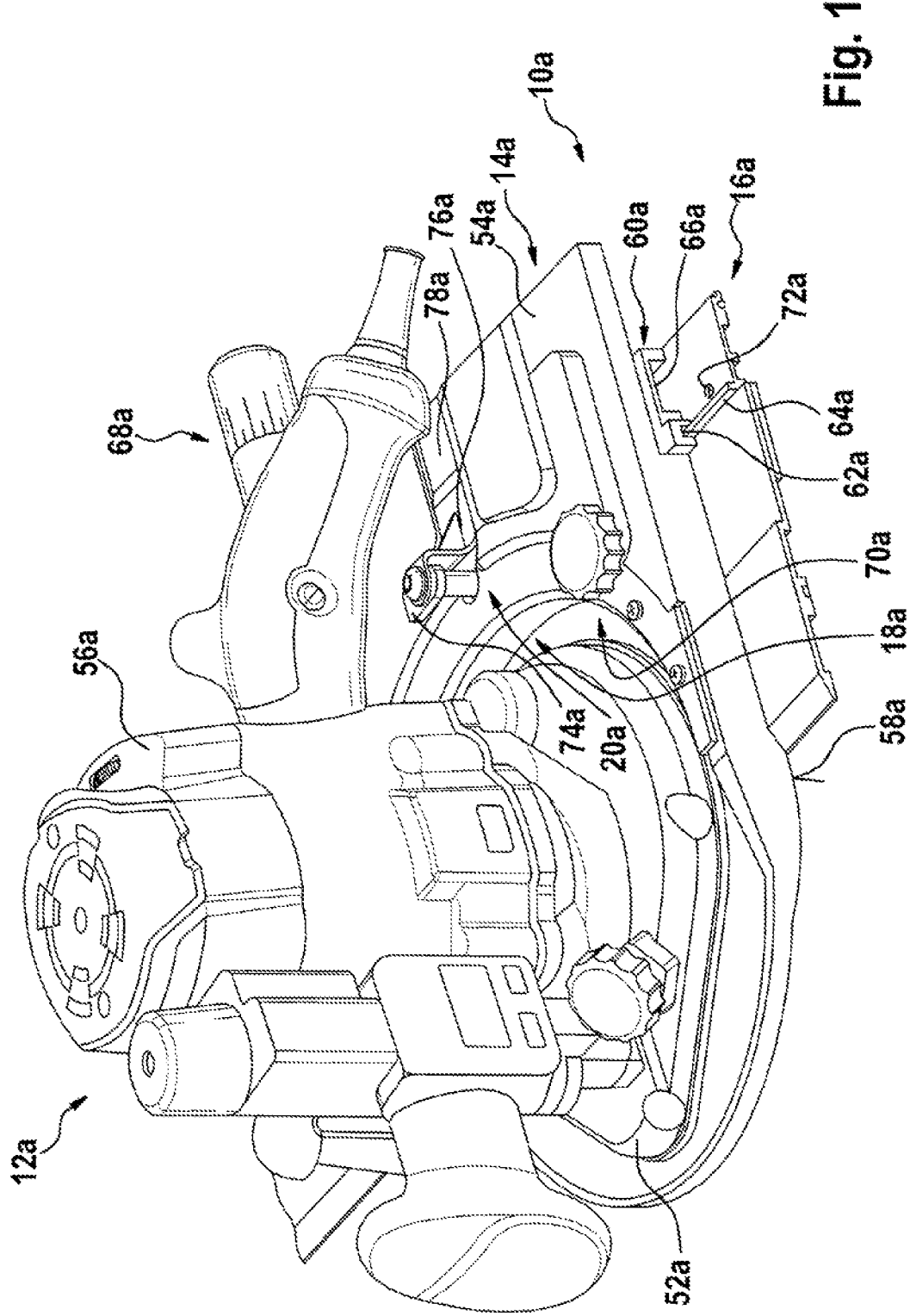
FIG. 1 shows a schematic representation of a processing system according to the disclosure with a guiding system according to the disclosure and a portable machine tool.

FIG. 1 shows a processing system which includes a guiding system 10a for portable machine tools 12a and a portable machine tool 12a which is realized as a surface milling machine. The guiding system 10a is realized as a linear guiding system for hand-held machine tools. In this connection, the guiding system 10a includes at least one guiding apparatus 14a which is fixable on the portable machine tool 12a, at least one positive guidance unit 16a to which the guiding apparatus 14a is connectable in a positive-locking manner to form positive guidance for the portable machine tool 12a, and at least one position fixing unit 18a for fixing a position of the guiding apparatus 14a on the positive guidance unit 16a. The portable machine tool 12a, which is realized as a surface milling machine, has at least in a substantial manner a development which is already known to an expert. The portable machine tool 12a includes a support unit 52a which is realized as a base plate on which the guiding apparatus 14a is fixable by means of fixing elements (not shown in any detail here) of the guiding apparatus 14a which are realized as screws. However, it is also conceivable for the portable machine tool 12a to be fixable to the guiding apparatus 14a by means of other fixing elements which appear sensible to an expert, such as, for example, by means of bayonet closures or latching elements etc. The guiding apparatus 14a has a basic body 54a for positive guidance of the portable machine tool 12a on the positive guidance unit 16a. The basic body 54a of the guiding apparatus 14a is arranged in an operating state on a side of the support unit 52a of the portable machine tool 12a remote from a machine tool housing 56a. In this connection, the basic body 54a of the guiding apparatus 14a is fixed by means of the fixing elements (not shown in any detail here) of the guiding apparatus 14a on the side of the support unit 52a remote from the machine tool housing 56a.

In addition, the basic body 54a of the guiding apparatus 14a has a supporting surface 58a which is provided for the purpose of lying on a workpiece to be processed (not shown in any detail here) in at least one operating state. The supporting surface 58a is provided for the purpose of lying on a surface of a workpiece to be processed with a guide unit 60a of the guiding apparatus 14a connected to the positive guidance unit 16a. With positive guidance of the portable machine tool 12a by means of interaction between the basic body 54a of the guiding apparatus 14a, the guide unit 60a and the positive guidance unit 16a, during processing of a workpiece by means of an insert tool (not shown in any detail here) which is arranged in a tool holder (not shown in any detail here) of the portable machine tool 12a, the support surface 58a consequently slides on the surface of the workpiece to be processed.

For positive guidance of the portable machine tool 12a on the positive guidance unit 16a, the guiding apparatus 14a has the guide unit 60a which is provided for a positive-locking connection to the positive guidance unit 16a. The guide unit 60a is mounted so as to be movable on the basic body 54a of the guiding apparatus 14a. In this connection, the guide unit 60a is mounted so as to be movable in a translatory manner on the basic body 54a of the guiding apparatus 14a. In addition, the guide unit 60a has a guide element 62a which is connectable in a positive-locking manner to a longitudinal guide element 64a of the positive guidance unit 16a. The guide element 62a is realized as a guide groove. The longitudinal guide element 64a of the positive guidance unit 16a is realized as a guide web which, when coupled to the guide element 62a, engages in the guide element 62a which is realized as a guide groove. Furthermore, the guide unit 60a includes a further guide element 66a which is connectable in a positive-locking manner to an alternative longitudinal guide element (not shown in any detail here) of an alternative positive guidance unit (not shown in any detail here). In this connection, the further guide element 66a is also realized as a guide groove. The guide element 62a and the further guide element 66a are arranged offset with respect to one another in an at least substantially parallel manner.

In addition, the guiding apparatus 14a has a fine adjustment unit 68a for a fine adjustment of a position of the guide unit 60a in relation to the basic body 54a of the guiding apparatus 14a, the fine adjustment unit 68a being arranged at least in part on the basic body 54a of the guiding apparatus 14a. The fine adjustment unit 68a is provided for the purpose of bringing about a translatory movement of the guide unit 60a in relation to the basic body 54a of the guiding apparatus 14a. Once a position of the guide unit 60a has been adjusted in relation to the basic body 54a of the guiding apparatus 14a by means of the fine adjustment unit 68a, the guide unit 60a can be fixed relative to the basic body 54a of the guiding apparatus 14a. To this end, the guiding apparatus 14a has a locking unit 70a for locking a position of the guide unit 60a in relation to the basic body 54a of the guiding apparatus 14a, the locking unit 70a being arranged at least in part on the basic body 54a of the guiding apparatus 14a.

Figure 4:
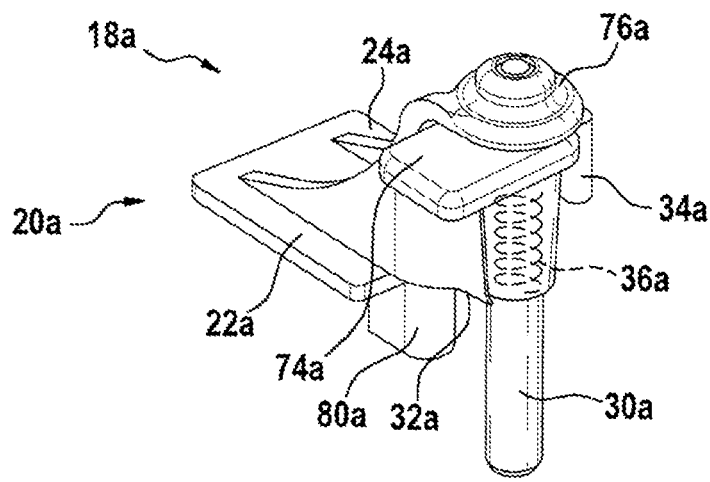
FIG. 4 shows a schematic representation of a view of a detail of a position fixing unit of the guiding system according to the disclosure.

For fixing a position of the guiding apparatus 14a on the positive guidance unit 16a, the guiding system 10a includes the position fixing unit 18a. The position fixing unit 18a fixes the guiding apparatus 14a in at least one state on the positive guidance unit 16a against a translatory movement in relation to the positive guidance unit 16a. To this end, the position fixing unit 18a includes at least one movably mounted latching element 30a for fixing a position of the guiding apparatus 14a on the positive guidance unit 16a. The latching element 30a, in this connection, is realized as a latching bolt (FIG. 4). For fixing a position of the guiding apparatus 14a on the positive guidance unit 16a, the latching element 30a interacts in a latching position with at least one counter latching element 72a of the positive guidance unit 16a. The counter latching element 72a is realized as a latching recess in which the latching element 30a engages in the latching position. The positive guidance unit 16a includes a plurality of counter latching elements 72a which are arranged evenly distributed along a longitudinal axis of the positive guidance unit 16a on the positive guidance unit 16a. In this connection, the counter latching elements 72a are arranged on the guide element 62a. However, it is also conceivable for the counter latching elements 72a to be arranged at another position, which seems sensible to an expert, on the positive guidance unit 16a. To move the latching element 30a out of the latching position, the position fixing unit 18a includes at least one control element 74a. The latching element 30a, in this connection, is connected in a non-rotatable and axial non-displaceable manner to the control element 74a. Consequently, common movement of the latching element 30a and of the control element 74a is ensured.

In addition, the position fixing unit 18a includes at least one spring element 36a which acts upon at least the latching element 30a of the position fixing unit 18a with a spring force in the direction of the latching position of the latching element 30a. The spring element 36a, in this connection, is realized as a helical compression spring. However, it is also conceivable for the spring element 36a to have another development which seems sensible to an expert. The spring element 36a is supported by way of one end on a basic body 76a of the position fixing unit 18a and by way of a further end the spring element 36a is supported on the control element 74a. However, it is also conceivable for the spring element 36a to be supported by way of one end on the basic body 76a of the position fixing unit 18a and by way of a further end directly on the latching element 30a.

For holding the latching element 30a in a release position in which the guiding apparatus 14a is movable in a translatory manner in relation to the positive guidance unit 16a, the position fixing unit 18a has at least one retaining element 32a. Consequently, the position fixing unit 18a includes at least one retaining element 32a by means of which at least one latching element 30a of the position fixing unit 18a is held against a movement as a result of a spring force. The retaining element 32a, in this connection, is realized as a transverse continuation which extends proceeding from the basic body 76a of the position fixing unit 18a at least substantially at right angles to an axis of movement of the latching element 30a. For holding the latching element 30a in the release position, the latching element 30a is moved in a translatory manner in opposition to a spring force of the spring element 36a by means of actuation of the control element 74a and is then rotated about the axis of movement of the latching element 30a until, when viewed along a direction which extends at least substantially parallel to the axis of movement of the latching element 30a, a continuation of the control element 74a and the retaining element 32a overlap one another. Consequently, the latching element 30a is held in the release position by means of a positive-locking connection between the control element 74a and the retaining element 32a against a movement as a result of a spring force of the spring element 36a. In total, the position fixing unit 18a has two retaining elements 32a, 34a. The retaining elements 32a, 34a, when viewed along a direction which extends about the axis of movement of the latching element 30a, are arranged on the basic body 76a of the position fixing unit 18a offset by 180° in relation to one another. For moving the latching element 30a into the latching position, the latching element 30a, proceeding from the release position, is rotated about the axis of movement of the latching element 30a by means of actuation of the control element 74a. As soon as the latching element 30a is aligned with one of the counter latching elements 72a, as a result of a spring force of the spring element 36a the latching element 30a automatically latches into the corresponding counter latching element 72a.

Figure 2:
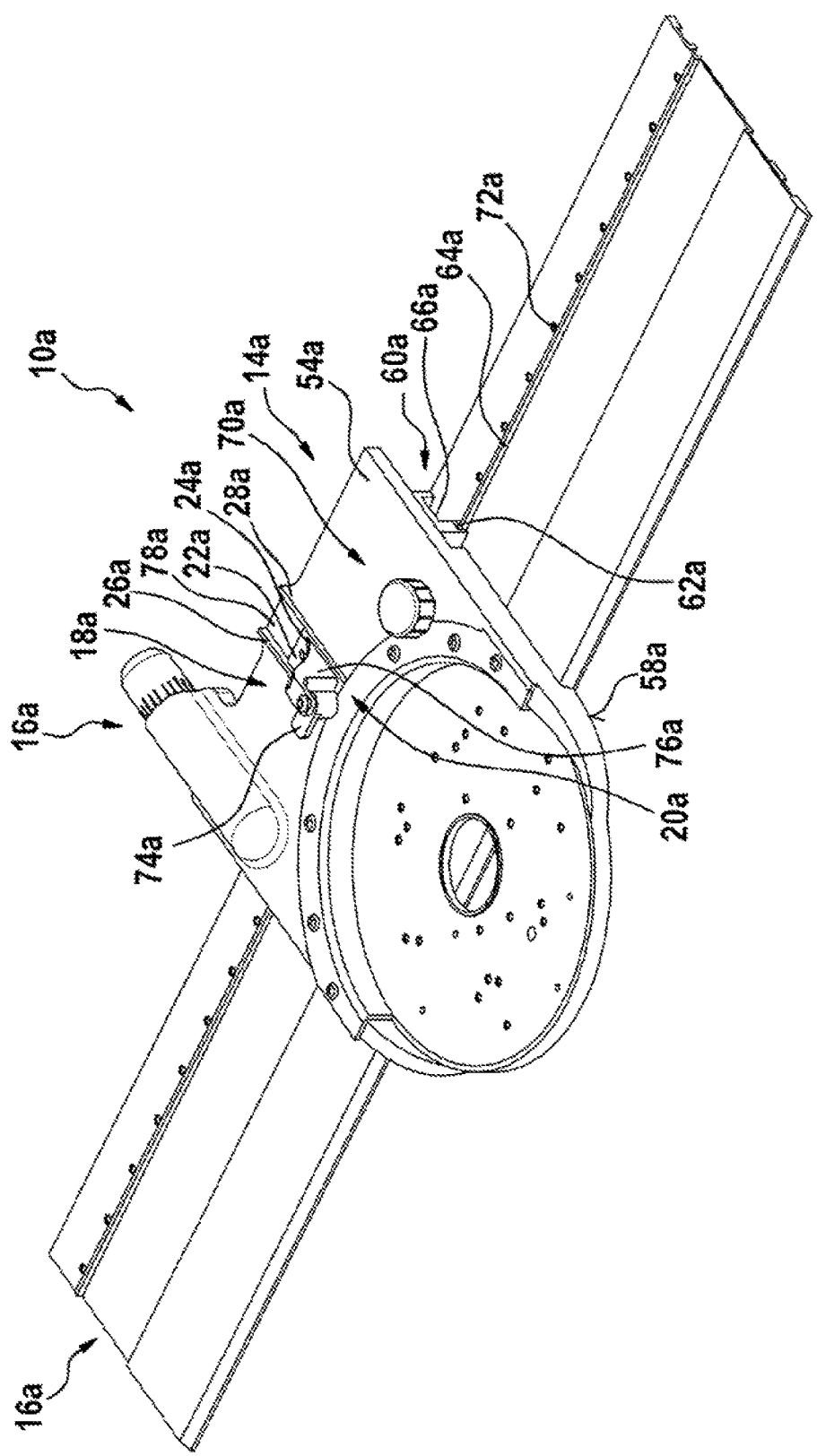
FIG. 2 shows a schematic representation of a view of a detail of the guiding system according to the disclosure.

The position fixing unit 18a has at least one fastening unit 20a for releasably fixing the position fixing unit 18a on the guiding apparatus 14a. The position fixing unit 18a is fastenable on the guiding apparatus 14a by an operator in a tool-free manner by means of the fastening unit 20a. For connection to the position fixing unit 18a, the guiding apparatus 14a includes at least one connecting recess 78a in which the position fixing unit 18a can be arranged (FIGS. 1, 2 and 4). The connecting recess 78a, in this connection, is arranged along a center axis of the basic body 54a of the guiding apparatus 14a. The fastening unit 20a includes at least one coupling element 22a, by means of which the position fixing unit 18a is fastenable in a positive-locking manner and/or in a friction-locking manner on the guiding apparatus 14a. The coupling element 22a is realized in a rib-shaped manner (FIG. 4). In this connection, the coupling element 22a extends along a direction which runs at least substantially at right angles to the axis of movement of the latching element 30a on the basic body 76a of the position fixing unit 18a. Consequently, the fastening unit 20a includes at least the coupling element 22a which interacts with a counter coupling element 26a of the guiding apparatus 14a for fastening the position fixing unit 18a. The counter coupling element 26a is realized as a groove. Furthermore, the counter coupling element 26a is arranged in an edge region of the basic body 54a of the guiding apparatus 14a which defines the connecting recess 78a. In all, the position fixing unit 18a has at least two coupling elements 22a, 24a. However, it is also conceivable for the position fixing unit 18a to include a number of coupling elements 22a, 24a which deviates from two. The coupling elements 22a, 24a, in this connection, are realized in an analogous manner with respect to one another, the coupling elements 22a, 24a being arranged on two sides of the basic body 76a of the position fixing unit 18a remote from one another (FIG. 4). In this connection, the coupling elements 22a, 24a are integrally molded on the basic body 76a of the position fixing unit 18a. The guiding apparatus 14a, in this connection, also includes two counter coupling elements 26a, 28a which are realized in an analogous manner with respect to one another and in a corresponding manner to the coupling elements 22a, 24a. The coupling elements 22a, 24a are introduced into the counter coupling elements 26a, 28a in the case of a connection between the position fixing unit 18a and the guiding apparatus 14a.

For fastening the position fixing unit 18a on the guiding apparatus 14a, the position fixing unit 18a includes at least one fastening element 80a (FIG. 4). The fastening element 80a is provided for fastening the position fixing unit 18a on the guiding apparatus 14a in a positive-locking and/or friction-locking manner. In this connection, the fastening element 80a interacts with the guide unit 60a. Consequently, the position fixing unit 18a, when arranged on the guiding apparatus 14a, is fastened on the guide unit 60a by means of the fastening element 80a against a movement in relation to the guide unit 60a. As a result, the position fixing unit 18a is arranged together with the guide unit 60a so as to be movable on the guiding apparatus 14a in a translatory manner in relation to the basic body 54a of the guiding apparatus 14a.

Figure 3:
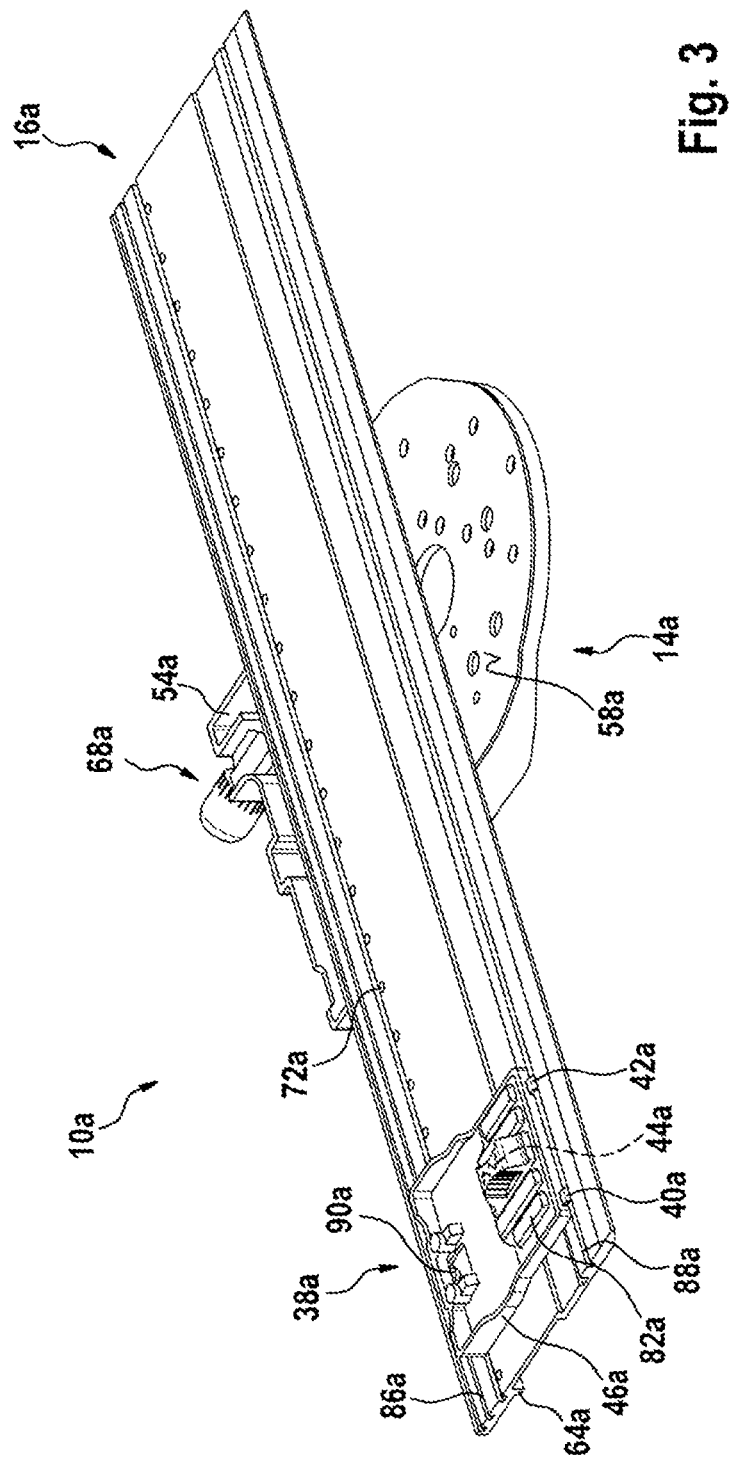
FIG. 3 shows a schematic representation of a view of a further detail of the guiding system according to the disclosure.
Figure 5:
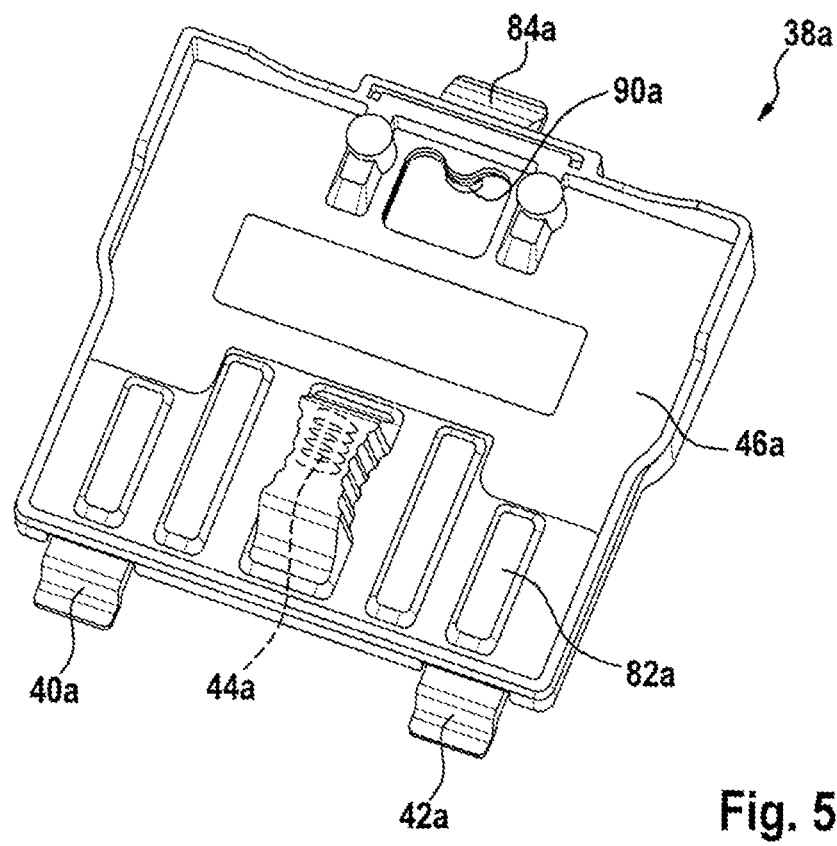
FIG. 5 shows a schematic representation of a view of a detail of a stop apparatus of the guiding system according to the disclosure.

In addition, the guiding system 10a includes at least one stop apparatus 38a which is releasably fastenable on the positive guidance unit 16a for positioning the positive guidance unit 16a on a workpiece (FIGS. 3 and 5). The stop apparatus 38a is fastenable on the positive guidance unit 16a by an operator in a tool-free manner. Consequently, by means of interaction between the guiding apparatus 14a, the positive guidance unit 16a, the stop apparatus 38a, the position fixing unit 18a and the portable machine tool 12a, it is possible to introduce a row of holes into a workpiece. The row of holes on the workpiece is provided for receiving shelf supports and/or hinges. The stop apparatus 38a is arranged, with the guiding apparatus 14a arranged on the positive guidance unit 16a, on a side of the positive guidance unit 16a remote from the guiding apparatus 14a on the positive guidance unit 16a. The stop apparatus 38a, in this connection, includes at least one movably mounted locking element 40a, by means of which the stop apparatus 38a is releasably fastenable in a position on the positive guidance unit 16a. In all, the stop apparatus 38a includes two movably mounted locking elements 40a, 42a. The locking elements 40a, 42a are realized in a hook-shaped manner. However, it is also conceivable for the stop apparatus 38a to include a number of locking elements 40a, 42a which deviates from two. The locking elements 40a, 42a, in this connection, are mounted so as to be translatory on a basic body 46a of the stop apparatus 38a. In this connection, the locking elements 40a, 42a are arranged together on a displacement element 82a of the stop apparatus 38a. The displacement element 82a is mounted on the basic body 46a of the stop apparatus 38a so as to be movable in a translatory manner. The displacement element 82a is actuated by an operator for common movement of the locking elements 40a, 42a. The stop apparatus 38a includes at least one spring element 44a which acts upon the locking elements 40a, 42a of the stop apparatus 38a with a spring force in the direction of a fixing position of the locking elements 40a, 42a. The spring element 44a of the stop apparatus 38a is supported by way of one end on the displacement element 82a and by way of a further end the spring element 44a of the stop apparatus 38a is supported on the basic body 46a of the stop apparatus 38a. The stop apparatus 38a also includes at least one clamping element 84a which is arranged on the basic body 46a of the stop apparatus 38a on a side of the basic body 46a of the stop apparatus 38a remote from the locking elements 40a, 42a.

For locking the stop apparatus 38a on the positive guidance unit 16a, the clamping element 84a is inserted into a groove 86a of the positive guidance unit 16a. The basic body 46a of the stop apparatus 38a is then moved in the direction of the positive guidance unit 16a until the locking elements 40a, 42a abut against the positive guidance unit 16a for example on the positive guidance unit 16a in the region of a further groove 88a of the positive guidance unit 16a. By displacing the displacement element 82a, the locking elements 40a, 42a are able to engage in the further groove 88a of the positive guidance unit 16a. Once the locking elements 40a, 42a are arranged in the further groove 88a and an actuating force acting on the displacement element 82a is lifted, the displacement element 82a is moved as a result of a spring force of the spring element 44a of the stop apparatus 38a in relation to the basic body 46a of the stop apparatus 38a. As a result, the locking elements 40a, 42a are clamped in the further groove 88a. Consequently, the stop apparatus 38a is fastened or clamped on the positive guidance unit 16a by means of interaction between the clamping element 84a, the groove 86a, the locking elements 40a, 42a and the further groove 88a. The stop apparatus 38a also includes an engagement element 90a which interacts with the counter latching elements 72a for association between spacings or for precise positioning of a row of holes, just as the position fixing unit 18a.

Figure 11:
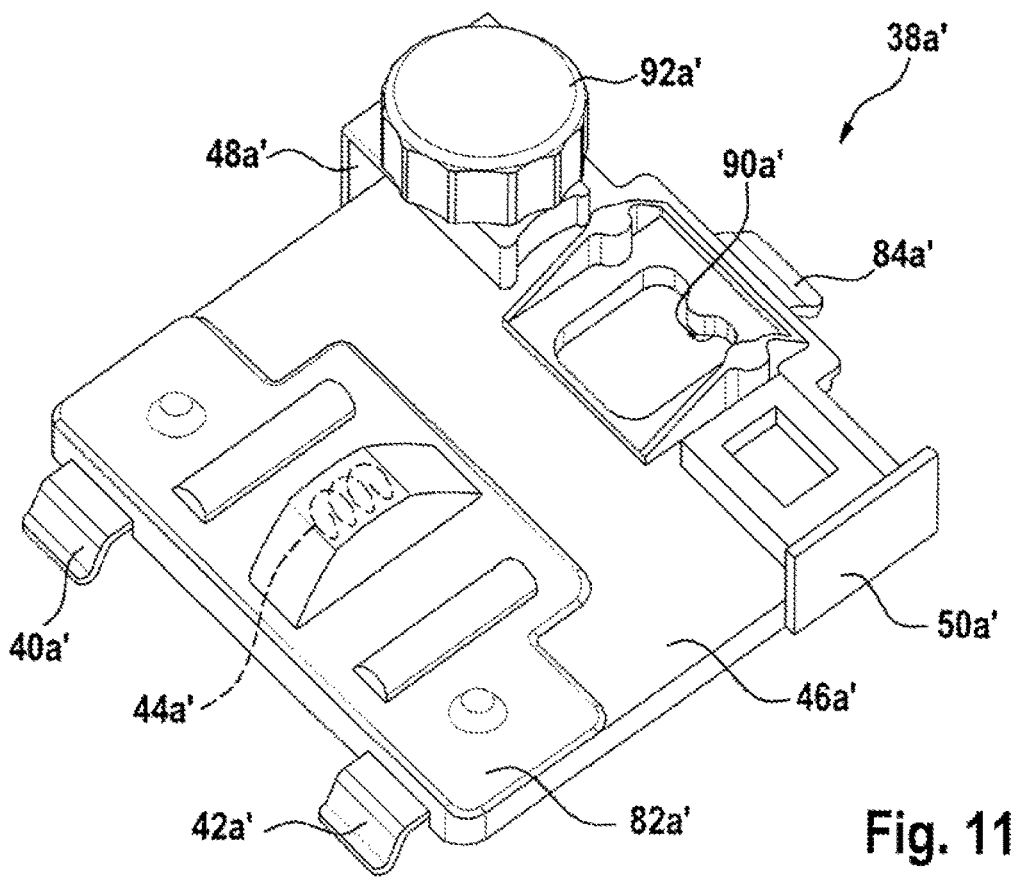

FIG. 11 shows a stop apparatus 38a' which is developed in an alternative manner to the stop apparatus 38a described in FIGS. 3 and 5. The alternative stop apparatus 38a' is realized in an at least substantially analogous manner to the stop apparatus 38a described in FIGS. 3 and 5. In contrast to the stop apparatus 38a described in FIGS. 3 and 5, the stop apparatus 38a' has at least one stop element 48a' which is movably mounted on a basic body 46a' of the stop apparatus 38a'. In all, the stop apparatus 38a' has at least two stop elements 48a', 50a' which are mounted so as to be movable on the basic body 46a'. However, it is also conceivable for the stop apparatus 38a' to include a number of stop elements 48a', 50a' which deviates from two. The stop elements 48a', 50a', in this connection, are mounted so as to be movable in a translatory manner on the basic body 46a' of the stop apparatus 38a'. An arrangement of the stop apparatus 38a' or of a positive guidance unit (not shown in FIG. 11) in relation to an edge of a workpiece to be processed for positioning a row of holes in dependence on a board thickness of a board arranged on a shelf support received by the row of holes can be achieved in an advantageous manner by means of a movable bearing arrangement of the stop elements 48a', 50a'. For fixing the stop elements 48a', 50a' on the basic body 46a' of the stop apparatus 38a', the stop apparatus 38a' includes at least one fixing element 92a'. The stop elements 48a', 50a' are connected technically so as to be movable together. Consequently, the stop elements 48a', 50a' are always moved in common. However, it is also conceivable for the stop elements 48a', 50a' to be movable independently of one another. In this connection, the alternative stop apparatus 38a', as an alternative to or in addition to the stop apparatus 38a described in FIGS. 3 and 5, can be fastened on a positive guidance unit 16a described as in FIGS. 1 to 5.

FIGS. 6 to 10 show alternative exemplary embodiments. Substantially unchanging components, features and functions are, in principle, numbered with the same references. To differentiate between the exemplary embodiments, the letters a to c are added to the references of the exemplary embodiments. The following description is restricted in a substantial manner to the differences to the first exemplary embodiment described in FIGS. 1 to 5, it being possible to refer to the description of the first exemplary embodiment in FIGS. 1 to 5 with reference to unchanging components, features and functions.

Figure 6:
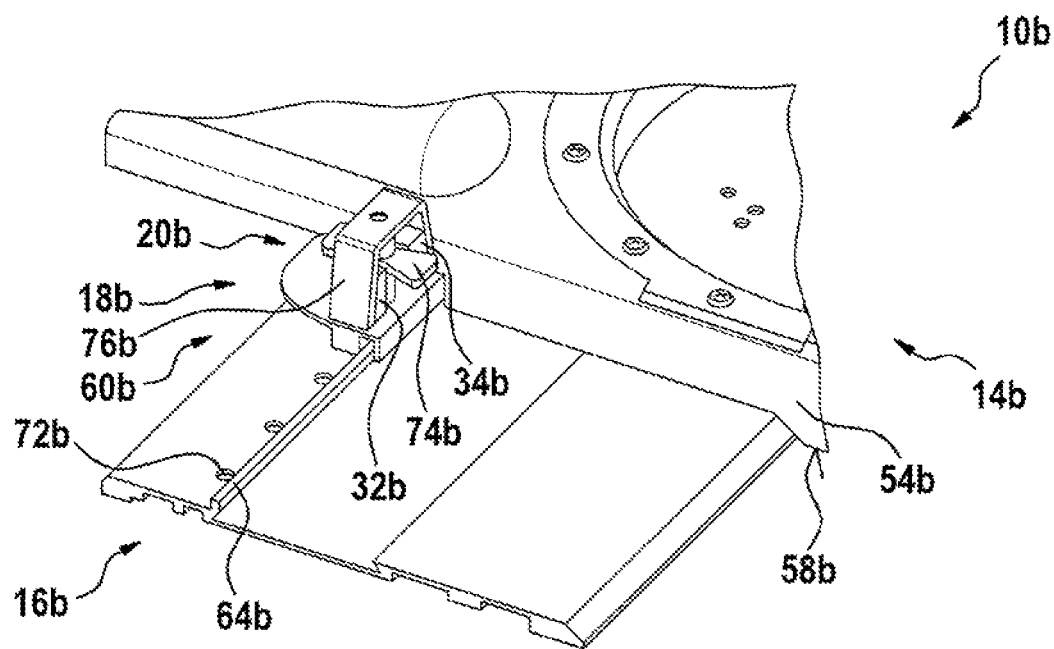
FIG. 6 shows a schematic representation of a view of a detail of an alternative guiding system according to the disclosure.
Figure 7:
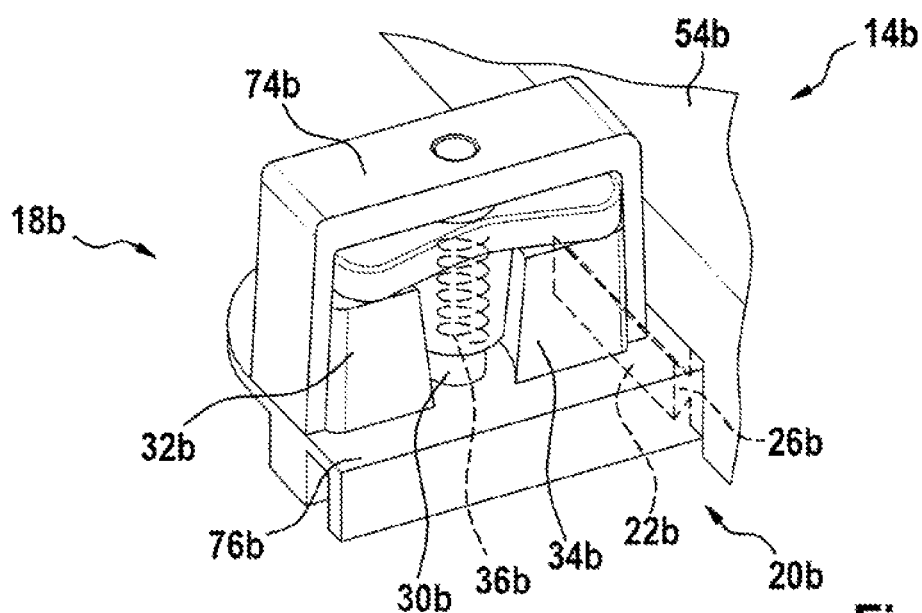
FIG. 7 shows a schematic representation of a view of a detail of a position fixing unit of the alternative guiding system according to the disclosure, with a latching element of the position fixing unit held in a release position.

FIG. 6 shows an alternative guiding system 10b for portable machine tools (not shown here in any detail) having at least one guiding apparatus 14b which is fixable on a portable machine tool, having at least one positive guidance unit 16b to which the guiding apparatus 14b is connectable in a positive-locking manner for positive guidance of the portable machine tool and having at least one position fixing unit 18b for fixing a position of the guiding apparatus 14b on the positive guidance unit 16b. The position fixing unit 18b has at least one fastening unit 20b for releasably fixing the position fixing unit 18b on the guiding apparatus 14b. The fastening unit 20b includes for this purpose at least one coupling element 22b, by means of which the position fixing unit 18b is fastenable in a positive-locking manner and/or in a friction-locking manner on the guiding apparatus 14b (FIG. 7). The coupling element 22b, for fastening the position fixing unit 18b, interacts with a counter coupling element 26b of the guiding apparatus 14b which is arranged on a guide unit 60b of the guiding apparatus 14b which is mounted so as to be movable on a basic body 54b of the guiding apparatus 14b. In this connection, the position fixing unit 18b is arranged on a side of the guide unit 60b which extends at least substantially transversely with respect to an axis of movement of the guiding apparatus 14b, along which the guide apparatus, 14b when arranged on the positive guidance unit 16b, is moveable in relation to the positive guidance unit 16b. Reference may be made to the guiding system 10a described in FIGS. 1 to 5 with regard to further features of the alternative guiding system 10b.

Figure 8:
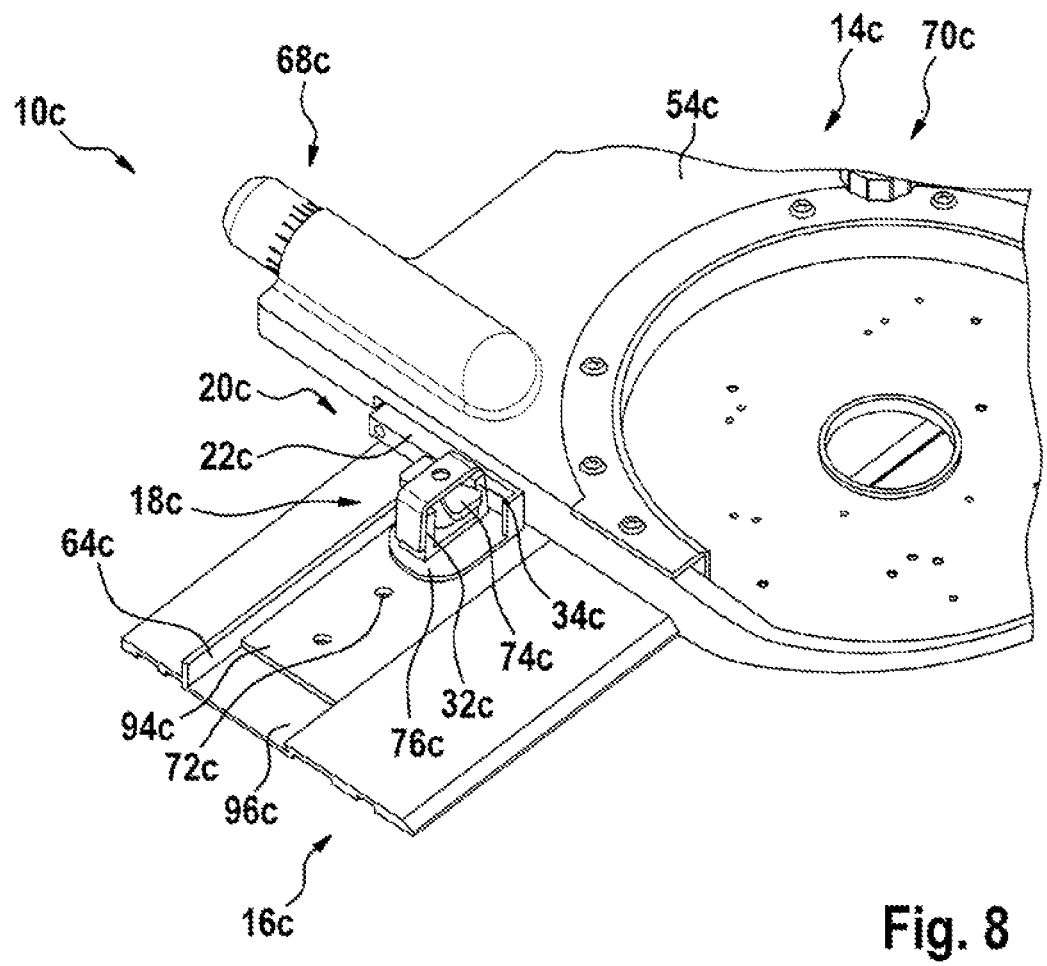
FIG. 8 shows a schematic representation of a view of a detail of a further alternative guiding system according to the disclosure.
Figure 9:
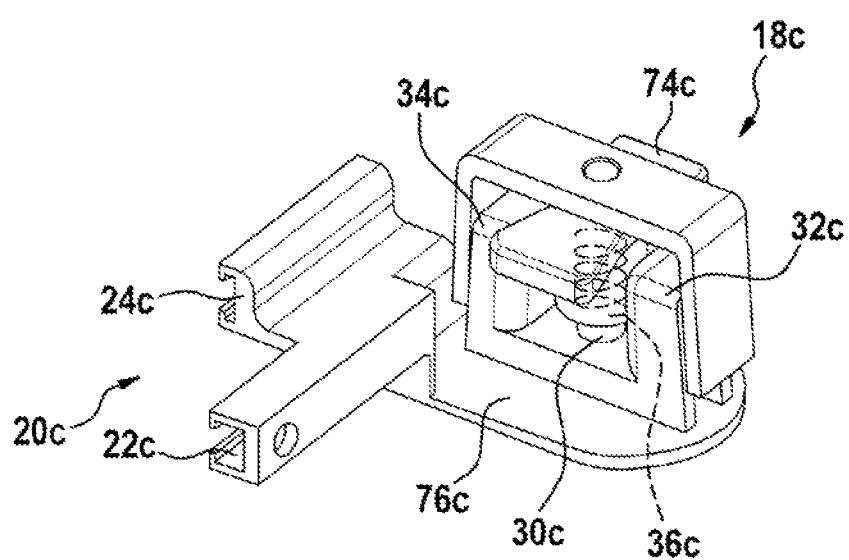
FIG. 9 shows a schematic representation of a view of a detail of a position fixing unit of the further alternative guiding system according to the disclosure.
Figure 10:
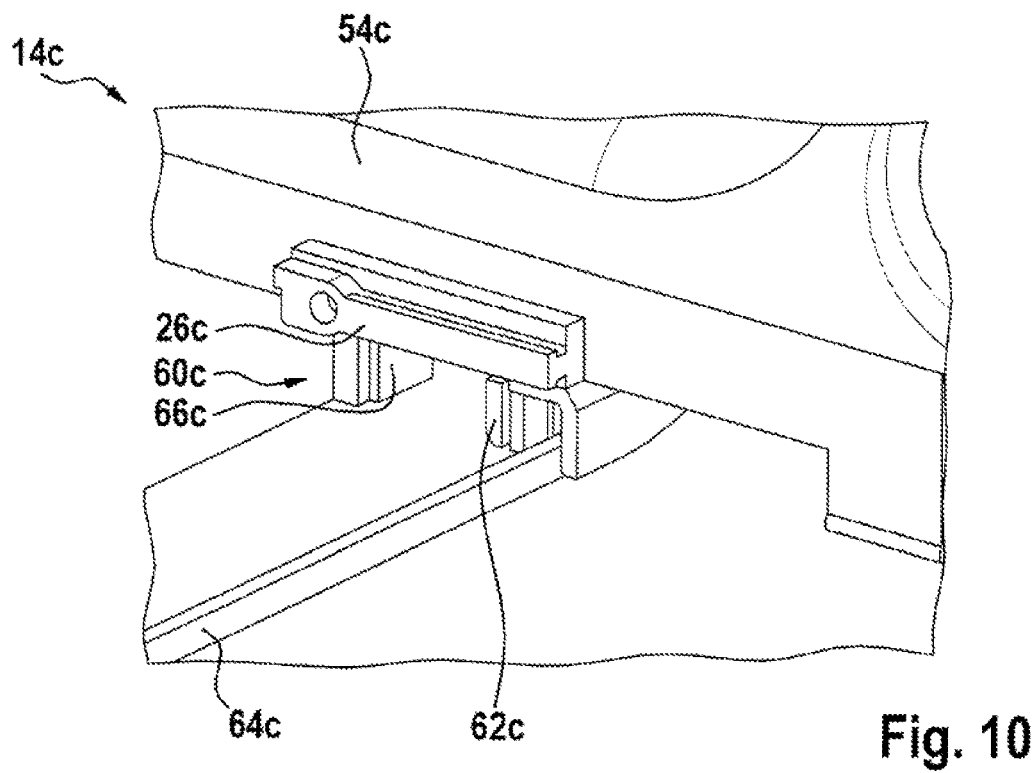
FIG. 10 shows a schematic representation of a view of a detail of a counter coupling element of a guiding apparatus of the further alternative guiding system according to the disclosure and FIG. 11 shows a schematic representation of a view of a detail of an alternative exemplary embodiment of a stop apparatus of a guiding system according to the disclosure.

FIG. 8 shows a further alternative guiding system 10c for portable machine tools (not shown in any detail here) having at least one guiding apparatus 14c which is fixable on a portable machine tool, having at least one positive guidance unit 16c to which the guiding apparatus 14c is connectable in a positive-locking manner for positive guidance of the portable machine tool, and having at least one position fixing unit 18c for fixing a position of the guiding apparatus 14c on the positive guidance unit 16c. The position fixing unit 18c has at least one fastening unit 20c for releasably fixing the position fixing unit 18c on the guiding apparatus 14c. The fastening unit 20c includes for this purpose at least one coupling element 22c by means of which the position fixing unit 18c is fastenable on the guiding apparatus 14c in a positive-locking manner and/or in a friction-locking manner. In all, the fastening unit 20c has two coupling elements 22c, 24c (FIG. 9). The coupling elements 22c, 24c are realized as dovetailing elements. For fastening the position fixing unit 18c, the coupling elements 22c, 24c interact with counter coupling elements 26c of the guiding apparatus 14c (only one of the counter coupling elements 26c shown in FIG. 10). The counter coupling elements 26c are arranged on a guide unit 60c of the guiding apparatus 14c which is mounted so as to be movable on a basic body 54c of the guiding apparatus 14c. In this connection, the position fixing unit 18c, when connected to the guide unit 60c, is arranged on a side of the guide unit 60c which extends at least substantially transversely with respect to an axis of movement of the guiding apparatus 14c, along which the guiding apparatus 14c, when arranged on the positive guidance unit 16c, is moveable in relation to the positive guidance unit 16c.

In addition, the further alternative guiding system 10c has at least one perforated rail element 94c (FIG. 8). The perforated rail element 94c is connectable to the positive guidance unit 16c in a positive-locking manner and/or in a friction-locking manner. In this connection, the perforated rail element 94c is insertable into a receiving recess 96c of the positive guidance unit 16c. A latching element 30c of the position fixing unit 18c interacts with counter latching elements 72c which are arranged on the perforated rail element 94c for fixing a position of the guiding apparatus 14c on the positive guidance unit 16c. Reference may be made to the guiding system 10a described in FIGS. 1 to 5 with regard to further features of the further alternative guiding system 10c.

What is claimed is:

1. A guiding system for portable machine tools, comprising:
    at least one guiding apparatus configured to receive a base portion of a portable machine tool and to fix the base portion on the guiding apparatus in a fixed position;
    at least one positive guidance unit (i) to which the guiding apparatus is connected in a positive-locking manner to define a first condition and (ii) from which the guiding apparatus is released to define a second condition, the positive guidance unit configured to positively guide the portable machine tool in a linear direction via translation of the guiding apparatus relative to the positive guidance unit when the positive guidance unit and the guiding apparatus are in the first condition and the guiding apparatus and the base portion are in the fixed position; and
    at least one position fixing unit mounted on the guiding apparatus and configured to be selectively engaged with a plurality of counter latching elements defined by the positive guidance unit, the counter latching elements defining a plurality of linear positions and being distributed evenly across an entire length of the positive guidance unit in the linear direction,
    wherein the at least one position fixing unit is configured to fix the guiding apparatus and the base portion on the positive guidance unit when the position fixing unit is engaged with any one of the counter latching elements and the guiding apparatus and the base portion are in the fixed position such that the guiding apparatus and the base portion cannot be moved relative to the positive guidance unit, and
    wherein the at least one position fixing unit has at least one fastening unit configured to releasably fix the at least one position fixing unit on the at least one guiding apparatus.

2. The guiding system according to claim 1, wherein the at least one fastening unit includes at least one coupling element configured to fasten the at least one position fixing unit in a positive-locking manner and/or in a friction-locking manner on the at least one guiding apparatus.

3. The guiding system according to claim 1, wherein the at least one fastening unit includes at least one coupling element configured to interact with a counter coupling element of the at least one guiding apparatus to fasten the at least one position fixing unit.

4. The guiding system according to claim 1, wherein the position fixing unit includes at least one movably mounted latching element configured to engage with the counter latching elements to fix the guiding apparatus on the positive guidance unit at the plurality of linear positions.

5. The guiding system according to claim 1, wherein the at least one position fixing unit includes at least one retaining element configured to hold at least one latching element of the at least one position fixing unit in opposition to a movement as a result of a spring force.

6. The guiding system according to claim 1, wherein the at least one position fixing unit includes at least one spring element configured to act upon at least one latching element of the at least one position fixing unit with a spring force in a direction of a latching position of the at least one latching element.

7. The guiding system according to claim 1, further comprising:
    at least one stop apparatus releasably fastenable on the at least one positive guidance unit and configured to position the at least one positive guidance unit on a workpiece.

8. The guiding system according to claim 7, wherein the at least one stop apparatus includes at least one movably mounted locking element configured to releasably fasten the at least one stop apparatus in a position on the at least one positive guidance unit.

9. The guiding system according to claim 7, wherein the at least one stop apparatus includes at least one spring element configured to act on at least one locking element of the at least one stop apparatus with a spring force in a direction of a fixing position of the at least one locking element.

10. The guiding system according to claim 7, wherein the at least one stop apparatus includes at least one stop element movably mounted on a basic body of the at least one stop apparatus.

11. The guiding system according to claim 1, wherein the portable machine tool is configured as a hand-held machine tool, and wherein the at least one positive guidance unit guides the hand-held machine tool in a linear manner.

12. The guiding system according to claim 1, wherein the guiding apparatus has a basic body with a supporting surface configured to lie on a surface of a workpiece to be processed by the portable machine tool.

13. The guiding system according to claim 12, wherein the guiding apparatus includes a guide unit that is mounted so as to be moveable in a translatory manner on the basic body of the guiding apparatus.

14. The guiding system according to claim 13, wherein the guide unit has a guide element that is connectable in a positive-locking manner to a longitudinal guide element of the positive guidance unit.

15. The guiding system according to claim 13, the guiding apparatus has a fine adjustment unit for fine adjustment of a position of the guide unit relative to the basic body of the guiding apparatus.

16. The guiding system according to claim 4, wherein the counter latching elements are configured as recesses defined in the positive guidance unit, and wherein the moveably mounted latching element engages in a respective one of the recesses to fix the linear position of the guiding apparatus on the positive guidance unit.

17. The guiding system according to claim 16, wherein the guiding apparatus defines a connecting recess through which a portion of the moveably mounted latching element extends to engage the recesses in the positive guidance unit.

18. The guiding system according to claim 1, wherein the positive guidance unit defines five counter latching elements corresponding to five respective linear positions of the guiding apparatus.

* * * * *